(12) United States Patent
Han et al.

(10) Patent No.: US 12,159,009 B2
(45) Date of Patent: Dec. 3, 2024

(54) TOUCH DISPLAY APPARATUS WITH LIGHT GUIDE PLATE USING INFRARED LIGHT FOR TOUCH DETECTION

(71) Applicant: Samsung Electronics Co., Ltd., Suwon-si (KR)

(72) Inventors: Changmin Han, Suwon-si (KR); Hyunki Kim, Suwon-si (KR); Huijun Shim, Suwon-si (KR); Jaekwang Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/713,733

(22) Filed: Apr. 5, 2022

(65) Prior Publication Data

US 2023/0046069 A1    Feb. 16, 2023

Related U.S. Application Data

(63) Continuation of application No. PCT/KR2021/014616, filed on Oct. 19, 2021.

(30) Foreign Application Priority Data

Aug. 10, 2021  (KR) .................. 10-2021-0105080

(51) Int. Cl.
*G06F 3/042*  (2006.01)
(52) U.S. Cl.
CPC ................. *G06F 3/0425* (2013.01)
(58) Field of Classification Search
CPC ...... G06F 3/0425; G06F 3/041; G06F 3/0412; G06F 3/0421; G02F 1/1333
See application file for complete search history.

(56) References Cited

U.S. PATENT DOCUMENTS 7,385,594 B2   6/2008  Liao et al.
8,581,882 B2  11/2013  Sohn et al.
(Continued)

FOREIGN PATENT DOCUMENTS

EP         2 853 997 A2   4/2015
JP       2007-156648 A    6/2007
(Continued)

OTHER PUBLICATIONS

International Search Report and Written Opinion dated Apr. 29, 2022, issued in International Patent Application No. PCT/KR2021/014616.

(Continued)

*Primary Examiner* — Amare Mengistu
*Assistant Examiner* — Sarvesh J Nadkarni
(74) *Attorney, Agent, or Firm* — Jefferson IP Law, LLP

(57) ABSTRACT

A touch display apparatus is provided. The touch display apparatus includes a display panel including a display surface, a light guide plate disposed over the display surface of the display panel and formed to emit light incident into one side surface of the light guide plate through an upper surface of the light guide plate, a first light source array disposed on one side of the light guide plate and including a plurality of infrared light sources configured to emit infrared rays to an one side surface of the light guide plate, a camera disposed on at least one side of the first light source array and configured to photograph infrared rays emitted through an entire area of the upper surface of the light guide plate, and a processor configured to recognize coordinates of an input object adjacent to the upper surface of the light guide plate using infrared rays images captured by the camera.

17 Claims, 15 Drawing Sheets

(56) References Cited

U.S. PATENT DOCUMENTS

| | | | |
|---|---|---|---|
| 8,830,208 B2 | 9/2014 | Sohn et al. | |
| 8,902,199 B2 | 12/2014 | Choi | |
| 9,086,761 B2 | 7/2015 | Lee et al. | |
| 2005/0184964 A1 | 8/2005 | Liao et al. | |
| 2009/0141002 A1 | 6/2009 | Sohn et al. | |
| 2010/0238138 A1* | 9/2010 | Goertz | G06F 3/0428 345/175 |
| 2010/0259492 A1* | 10/2010 | Chang | G06F 3/0425 345/173 |
| 2011/0148816 A1* | 6/2011 | Jhu | G06F 3/0412 345/175 |
| 2012/0127128 A1* | 5/2012 | Large | G06F 3/0425 345/175 |
| 2012/0162138 A1 | 6/2012 | Lee et al. | |
| 2012/0224054 A1* | 9/2012 | Ogawa | G06T 1/00 348/135 |
| 2012/0293461 A1* | 11/2012 | Choi | G06F 3/0423 345/175 |
| 2018/0348960 A1 | 12/2018 | Shinohara et al. | |

FOREIGN PATENT DOCUMENTS

| | | |
|---|---|---|
| JP | 4159552 B2 | 10/2008 |
| JP | 6787566 B2 | 11/2020 |
| KR | 10-2009-0026957 A | 3/2009 |
| KR | 10-2009-0118792 A | 11/2009 |
| KR | 10-0942431 B1 | 2/2010 |
| KR | 10-1009912 B1 | 1/2011 |
| KR | 10-2012-0073763 A | 7/2012 |
| KR | 10-1221676 B1 | 1/2013 |
| KR | 10-1312805 B1 | 9/2013 |
| KR | 10-1407300 B1 | 6/2014 |
| KR | 10-1407301 B1 | 6/2014 |
| KR | 10-1494787 B1 | 2/2015 |
| KR | 10-2158613 B1 | 9/2020 |

OTHER PUBLICATIONS

Extended European Search Report dated Oct. 7, 2024, issued in European Patent Application No. 21953550.7.

* cited by examiner

TOUCH DISPLAY APPARATUS WITH LIGHT GUIDE PLATE USING INFRARED LIGHT FOR TOUCH DETECTION

CROSS-REFERENCE TO RELATED APPLICATION(S)

This application is a continuation application, claiming priority under § 365(c), of an International application No. PCT/KR2021/014616, filed on Oct. 19, 2021, which is based on and claims the benefit of a Korean patent application number 10-2021-0105080, filed on Aug. 10, 2021, in the Korean Intellectual Property Office, the disclosure of which is incorporated by reference herein in its entirety.

BACKGROUND

1. Field

The disclosure relates to a display apparatus. More particularly, the disclosure relates to a touch display apparatus having a touch function.

2. Description of the Related Art

Generally, a touch panel is one of several manners of configuring an interface between an electronic device having a display and a user. The touch panel is an input device that enables the user to operate the electronic device by directly touching a screen of the display with a hand or a stylus pen.

The touch panel enables intuitive operation of electronic devices by simply touching buttons displayed on the screen of the display with a finger. Therefore, the touch panel is widely used in smartphones, tablet computers, various medical devices, automatic teller machines (ATMs), kiosks for information about tourism and major institutions, kiosks for traffic information, kiosks for ordering food, etc.

According to the recognition method, the touch panels may be classified into resistive type touch panel, capacitive touch panel, ultrasonic touch panel, infrared type touch panel, etc.

The touch panels according to the prior art may have a problem in that the electronic device can be operated only by directly touching the screen of the display.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a touch display apparatus capable of operating an electronic device not only in contact with a display surface but also adjacent to the display surface.

In accordance with an aspect of the disclosure, a touch display apparatus is provided. The touch display apparatus includes a display panel including a display surface, a light guide plate disposed over the display surface of the display panel and formed to emit light incident into one side surface of the light guide plate through an upper surface of the light guide plate, a first light source array disposed on one side of the light guide plate and including a plurality of infrared light sources configured to emit infrared rays to an one side surface of the light guide plate, a camera disposed on at least one side of the first light source array and configured to photograph infrared rays emitted through an entire area of the upper surface of the light guide plate, and a processor configured to recognize coordinates of an input object adjacent to the upper surface of the light guide plate using infrared rays images captured by the camera.

The touch display apparatus may include a second light source array disposed above the first light source array and including a plurality of infrared light sources configured to emit infrared rays toward an upper side of the upper surface of the light guide plate, wherein the camera may be configured to photograph infrared rays emitted from the second light source array.

The plurality of infrared light sources of the second light source array may be disposed in a straight line parallel to the plurality of infrared light sources of the first light source array.

The touch display apparatus may include a printed circuit board on which the plurality of infrared light sources of the first light source array and the plurality of infrared light sources of the second light source array are disposed in two rows.

The processor may be disposed on the printed circuit board.

The processor may be configured to recognize a reference touchable region from an upper surface image of the light guide plate captured by the camera in a state in which the first light source array is turned on and the second light source array is turned off. The processor may be configured so that when recognizing the coordinates of the input object adjacent to the light guide plate, the processor extracts a touchable region by removing a region outside the upper surface of the light guide plate from an adjacent upper surface image of the light guide plate captured by the camera while the first light source array and the second light source array are turned on, and detects the coordinates of the input object by comparing the touchable region with the reference touchable region.

The light guide plate may be formed in a rectangular flat plate shape, and include a first surface, a second surface facing the first surface and over which the display panel is disposed, and four side surfaces, wherein the first light source array may be disposed such that infrared rays are incident on a first side surface of the four side surfaces of the light guide plate, and wherein the light guide plate may be formed so that the infrared rays incident on the first side surface are emitted through the first surface.

The plurality of infrared light sources of the first light source array may be disposed in a straight line along the first side surface of the light guide plate.

A second side surface and a third side surface perpendicular to the first side surface among the four side surfaces of the light guide plate may be formed so that infrared rays incident from the first light source array into the light guide plate are not emitted to an outside of the light guide plate.

The camera may include a wide-angle lens and an image sensor to photograph infrared rays emitted from the first light source array and emitted through the entire area of the upper surface of the light guide plate.

An angle of view of the wide-angle lens may be greater than 90 degrees.

The camera may include a first camera disposed on one side of the first light source array and configured to photograph the entire area of the upper surface of the light guide plate, and a second camera disposed on another side of the first light source array opposite to the first camera and configured to photograph the entire area of the upper surface of the light guide plate.

Each of the first camera and the second camera may include a wide-angle lens and an image sensor, wherein an angle of view of the wide-angle lens is greater than 90 degrees.

The processor may be configured to recognize a reference touchable region from an upper surface image of the light guide plate captured by the camera in a state in which the first light source array is turned on. The processor may be configured so that when recognizing the coordinates of the input object adjacent to the light guide plate, the processor extracts a touchable region by removing a region outside the upper surface of the light guide plate from an adjacent upper surface image of the light guide plate captured by the camera while the first light source array is turned on, and recognizes the coordinates of the input object by comparing the extracted touchable region with the reference touchable region.

The plurality of infrared light sources may include a plurality of infrared light emitting diodes (LEDs).

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION OF THE EMBODIMENTS

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms 'first', 'second', etc. may be used to describe diverse components, but the components are not limited by the terms. The terms may only be used to distinguish one component from the others. For example, without departing from the scope of the disclosure, a first component may be referred to as a second component, and similarly, a second component may also be referred to as a first component.

The terms used in embodiments of the disclosure may be construed as commonly known to those skilled in the art unless otherwise defined.

Further, the terms 'leading end', 'rear end', 'upper side', 'lower side', 'top end', 'bottom end', etc. used in the disclosure are defined with reference to the drawings. However, the shape and position of each component are not limited by the terms.

Hereinafter, embodiments of a touch display apparatus according to the disclosure will be described in detail with reference to the accompanying drawings.

Figure 1:
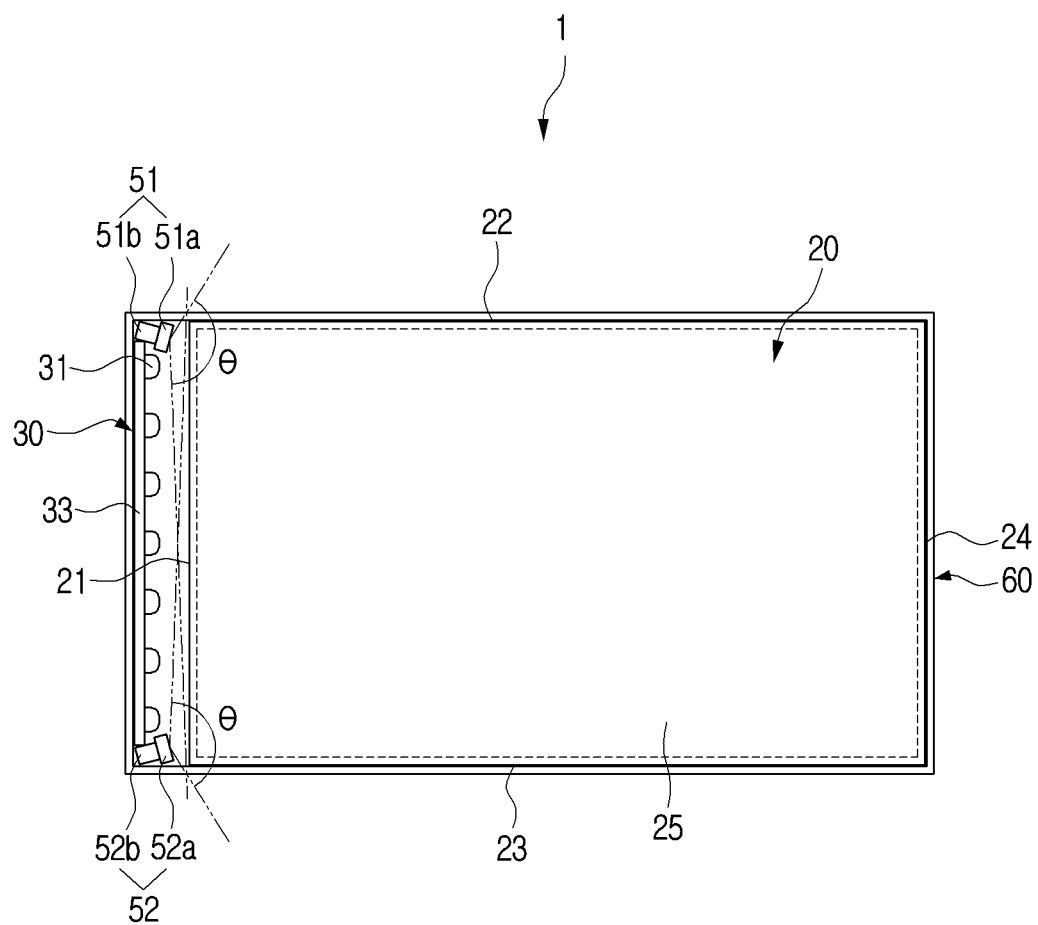
FIG. 1 is a plan view illustrating a touch display apparatus according to an embodiment of the disclosure.

FIG. 1 is a plan view illustrating a touch display apparatus according to an embodiment of the disclosure.

Figure 2:
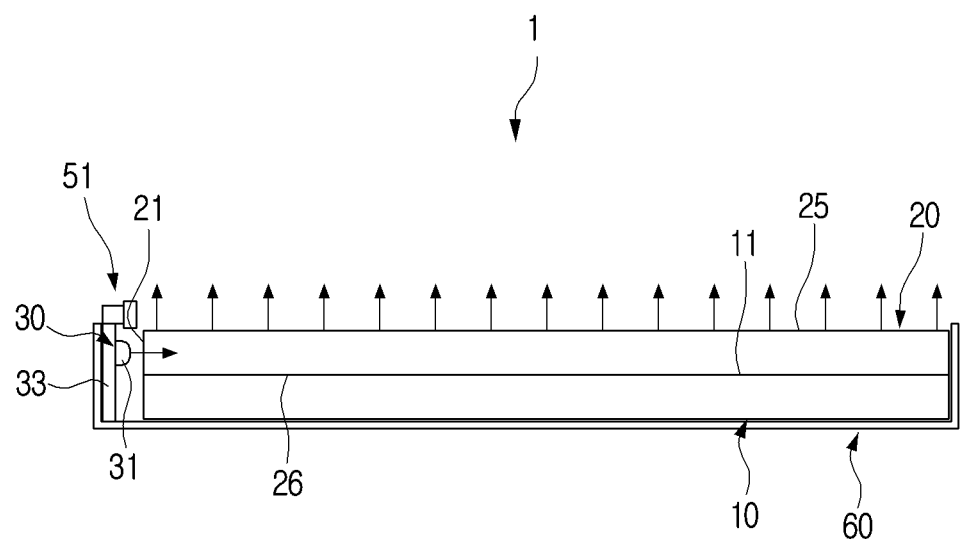
FIG. 2 is a cross-sectional view illustrating a touch display apparatus according to an embodiment of the disclosure.

FIG. 2 is a cross-sectional view illustrating a touch display apparatus according to an embodiment of the disclosure.

Figure 3:
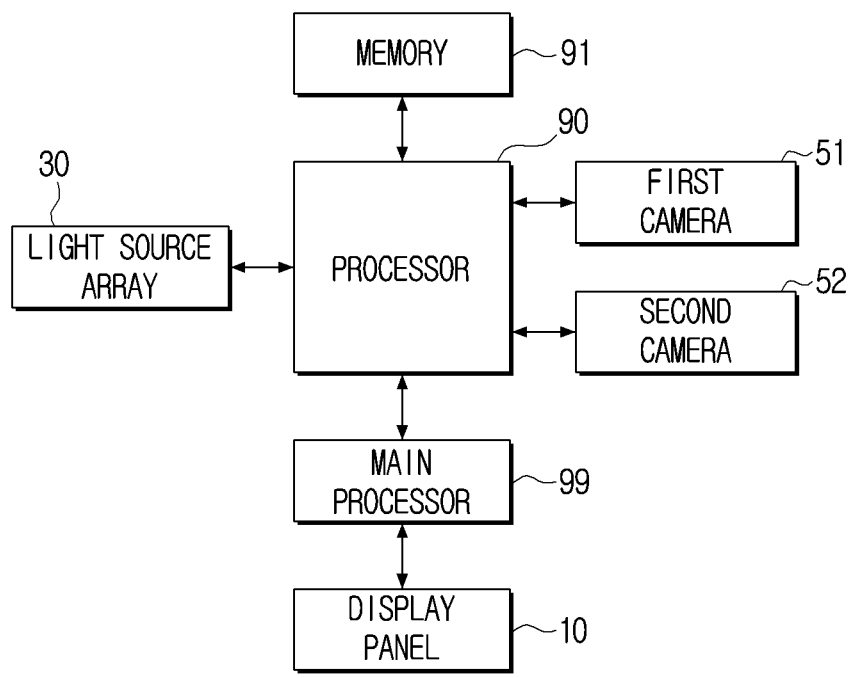
FIG. 3 is a functional block diagram of a touch display apparatus according to an embodiment of the disclosure.

FIG. 3 is a functional block diagram of a touch display apparatus according to an embodiment of the disclosure.

Referring to FIGS. 1, 2 and 3, a touch display apparatus 1 according to an embodiment may include a display panel 10, a light guide plate 20, a light source array 30, cameras 51 and 52, and a processor 90.

The display panel 10 may be configured to display an image. The display panel 10 may be formed in a substantially rectangular flat plate shape. The display panel 10 may include a display surface 11 on which an image is displayed.

The display panel 10 may be implemented in various types. For example, the display panel 10 may include various types of display panels such as a liquid crystal display (LCD) panel, an organic light emitting diode (OLED) panel, a quantum dot light emitting diode (QLED) panel, a micro light emitting diode (LED) panel, and the like. A display panel according to the related art may be used as the display panel 10; therefore, a detailed description thereof is omitted.

Referring to FIG. 2, the light guide plate 20 may be disposed over the display panel 10. In detail, the light guide plate 20 may be disposed over the display surface 11 of the display panel 10. Referring to FIG. 1, the light guide plate 20 may be positioned in front of the display panel 10. In the following description, it will be described that the light guide plate 20 is disposed over the display panel 10 with reference to FIG. 2.

The light guide plate 20 may be formed in a rectangular flat plate shape, and may include a first surface (i.e., upper surface 25), a second surface 26 facing the first surface (i.e., upper surface 25), and four side surfaces. In detail, the first surface (i.e., upper surface 25) and the second surface 26 are formed in a rectangular shape and face each other in parallel. The first surface (i.e., upper surface 25) may form the upper surface of the light guide plate 20 and the second surface 26 may form the lower surface of the light guide plate 20.

The four side surfaces of the light guide plate 20 may include a first side surface 21, a second side surface 22, a third side surface 23, and a fourth side surface 24 connecting the first surface (i.e., upper surface 25) and the second surface 26. The second side surface 22 and the third side surface 23 are perpendicular to the first side surface 21 and parallel to each other. The fourth side surface 24 is parallel to the first side surface 21 and perpendicular to the second side surface 22 and the third side surface 23.

The display panel 10 is disposed in the lower surface (i.e., second surface 26) of the light guide plate 20, that is, the second surface 26 of the light guide plate 20. Accordingly, the lower surface (i.e., second surface 26) of the light guide plate 20 and the display surface 11 of the display panel 10 face each other. The light guide plate 20 may be formed to be larger than the size of the display surface 11 of the display panel 10.

The light guide plate 20 may be formed to emit light incident on one side surface through the upper surface 25 of the light guide plate 20. For example, the light guide plate 20 may be formed to emit light incident into the light guide plate 20 through the first side surface 21 to the outside through the upper surface 25, that is, the first surface.

The second surface 26 and the third side surface 23 perpendicular to the first side surface 21 of the light guide plate 20 may be formed so that light incident on the first side surface 21 is not emitted to the outside through the second side surface 22 and the third side surface 23. For example, the inner surface of the second side surface 22 and the inner surface of the third side surface 23 may be formed to reflect or block light. Alternatively, the second side surface 22 and the third side surface 23 of the light guide plate 20 may be formed to transmit light, and a blocking plate configured to block light or a reflecting plate configured to reflect light may be disposed on each of the second side surface 22 and the third side surface 23.

In addition, the fourth side surface 24 facing and parallel to the first side surface 21 may be formed so that light incident into the light guide plate 20 through the first side surface 21 is not emitted to the outside of the light guide plate 20 through the fourth side surface 24.

When the second side surface 22, the third side surface 23, and the fourth side surface 24 of the light guide plate 20 are formed such that light is not emitted therethrough, the light incident on the first side surface 21 is not emitted through the second side surface 22, the third side surface 23, and the fourth side surface 24, but only through the first surface (i.e., upper surface 25).

Accordingly, the cameras 51 and 52 photographs the upper surface 25 of the light guide plate 20, the processor 90 may recognize an area of the upper surface 25 of the light guide plate 20 from the infrared image of the light guide plate 20 captured by the cameras 51 and 52. Therefore, the processor 90 may recognize the entire area of the upper surface 25 of the light guide plate 20 as a touchable region.

The light guide plate 20 may be formed of a transparent material through which light passes. For example, the light guide plate 20 may be formed of transparent plastic, transparent resin, and the like. Accordingly, the image displayed on the display surface 11 of the display panel 10 may be view by the user through the light guide plate 20.

The light source array 30 may include a plurality of infrared light sources 31 and may be configured to emit infrared rays. The light source array 30 may be disposed on one side of the light guide plate 20. For example, the light source array 30 may be disposed adjacent to the first side surface 21 of the light guide plate 20. Alternatively, the light source array 30 may be disposed to contact the first side surface 21 of the light guide plate 20. Accordingly, infrared rays emitted from the light source array 30 may be incident into the light guide plate 20 through the first side surface 21 of the light guide plate 20.

The plurality of infrared light sources 31 of the light source array 30 may be arranged in a straight line along one side surface of the light guide plate 20. The light source array 30 may include a printed circuit board 33 on which the plurality of infrared light sources 31 are disposed.

The printed circuit board 33 may be disposed in parallel with the one side surface of the light guide plate 20. The plurality of infrared light sources 31 may be provided in a straight line parallel to one side surface of the light guide plate 20 on one surface of the printed circuit board 33 facing the one side surface of the light guide plate 20.

Accordingly, infrared rays emitted from the light source array 30 may be incident on the first side surface 21 of the light guide plate 20, and then may be emitted through the first surface (i.e., upper surface 25), that is, the upper surface of the light guide plate 20. When some of infrared rays leaks from the lower surface (i.e., second surface 26) of the light guide plate 20, the leaked infrared rays may be reflected by the display surface 11 of the display panel 10, input into the lower surface (i.e., second surface 26) of the light guide plate 20, and emitted to the outside through the upper surface 25 of the light guide plate 20.

The plurality of infrared light sources 31 constituting the light source array 30 may be formed of infrared light emitting diodes (LEDs).

The cameras 51 and 52 may be configured to photograph infrared rays emitted from the light guide plate 20. The cameras 51 and 52 may be provided to photograph the entire upper surface 25 of the light guide plate 20. In detail, the cameras 51 and 52 may be configured to photograph infrared rays emitted through the entire area of the upper surface 25 of the light guide plate 20.

To this end, each of the cameras 51 and 52 may include a wide-angle lens and an image sensor. The wide-angle lens has an angle of view capable of capturing the entire upper surface 25 of the light guide plate 20. For example, the angle of view of the wide-angle lens may be greater than or equal to 90 degrees.

The image sensor may be configured to generate an image of incident infrared rays. For example, when the light source array 30 emits infrared rays, the image sensor may generate an upper surface image by capturing infrared rays emitted through the entire area of the upper surface 25 of the light guide plate 20.

The cameras 51 and 52 may be disposed on one side of the light source array 30. However, the positions of the cameras 51 and 52 are not limited thereto. As long as the cameras 51 and 52 can photograph the entire upper surface 25 of the light guide plate 20, they may be disposed in any position.

As illustrated in FIG. 1, the camera may include a first camera 51 and a second camera 52.

The first camera 51 may be disposed on one side of the light source array 30, and may be provided to capture the entire area of the upper surface 25 of the light guide plate 20. The first camera 51 may include a wide-angle lens 51a and an image sensor 51b to photograph infrared rays emitted through the entire area of the upper surface 25 of the light guide plate 20 after being emitted from the light source array 30.

The second camera 52 may be disposed on the other side of the light source array 30 opposite to the first camera 51, and may be provided to capture the entire area of the upper surface 25 of the light guide plate 20. The second camera 52 may include a wide-angle lens 52a and an image sensor 52b to photograph infrared rays emitted through the entire area of the upper surface 25 of the light guide plate 20 after being emitted from the light source array 30.

As illustrated in FIG. 1, the angle of view of each of the wide-angle lens 51a of the first camera 51 and the wide-angle lens 52a of the second camera 52 may be 90 degrees or more.

The first camera 51 and the second camera 52 may be disposed on both sides of the light source array 30 on the printed circuit board 33.

The first camera 51 may generate an upper surface image of the light guide plate 20, and the second camera 52 may also generate an upper surface image of the light guide plate 20. When the two cameras 51 and 52 are configured to generate the upper surface image of the light guide plate 20 in this way, the coordinates of an input object 70 (see FIG. 4) contacting or adjacent to the light guide plate 20 may be accurately calculated.

The processor 90 may be configured to recognize the coordinates of the input object 70 contacting or adjacent to the light guide plate 20 using the images captured by the cameras 51 and 52. The processor 90 may transmit the recognized coordinates of the input object 70 to a main processor 99. The coordinates of the input object 70 recognized by the processor 90 refers to two-dimensional coordinates of a position of the tip of the input object 70 on the display surface 11. In other words, the coordinates of the input object 70 are two-dimensional coordinates based on the display surface 11.

The input object 70 refers to an object formed to select at least one point of an image displayed through the light guide plate 20. For example, the input object 70 may include a user's finger, a stylus, a pen, a pointing rod, a baton, an antenna, a stick, and the like.

The processor 90 may be configured to control the on/off of the light source array 30. In addition, the processor 90 may turn on the light source array 30, control the cameras 51 and 52 to photograph infrared rays emitted through the upper surface 25 of the light guide plate 20 when the input object 70 is not adjacent to the upper surface 25 of the light guide plate 20 so as to generate upper surface images, and receive the upper surface images generated by the cameras 51 and 52 from the cameras 51 and 52.

The processor 90 may recognize and store an image of an area corresponding to the entire area of the upper surface 25 of the light guide plate 20 through which infrared rays are emitted from the upper surface images received from the cameras 51 and 52 as a reference touchable region.

In addition, the processor 90 may control the cameras 51 and 52 to photograph infrared rays emitted from the upper surface 25 of the light guide plate 20 and infrared rays reflected by the input object 70 so as to generate adjacent upper surface images when the input object 70 is adjacent to or in contact with the light guide plate 20 while the light source array 30 is turned on, and receive the adjacent upper surface images generated by the cameras 51 and 52.

The case that the input object 70 is adjacent to the light guide plate 20 refers to the case that the input object 70 is located close to the upper surface 25 of the light guide plate 20 to such an extent that the first and second cameras 51 and 52 can capture infrared rays reflected by the input object 70. Accordingly, the case that the input object 70 is adjacent to the light guide plate 20 may include the case that the input object 70 is in contact with the upper surface 25 of the light guide plate 20 and the case that the input object 70 is close to the upper surface 25 of the light guide plate 20 without contacting the upper surface 25.

The processor 90 may be configured to recognize the coordinates of the input object 70 using the upper surface images and the adjacent upper surface images captured by the cameras 51 and 52. A image processing technology of the related art may be used as the image processing technology in which the processor 90 recognizes the coordinates of the input object 70 by using images, and thus a detailed description thereof is omitted.

The processor 90 may transmit the coordinates of the input object 70 recognized using the upper surface image and the adjacent upper surface image to the main processor 99.

When the cameras include the first camera 51 and the second camera 52, the processor 90 may control the first camera 51 and the second camera 52 and receive the upper surface image and the adjacent upper surface image captured by each of the first camera 51 and the second camera 52.

In detail, the processor 90 turns on the light source array 30 and controls the first camera 51 and the second camera 52 to photograph the upper surface 25 of the light guide plate 20 before the input object 70 is adjacent to the light guide plate 20. Then, the first camera 51 may generate a first upper surface image by capturing infrared rays emitted from the upper surface 25 of the light guide plate 20, and the second camera 52 may generate a second upper surface image by capturing infrared rays emitted from the upper surface 25 of the light guide plate 20.

The first camera 51 transmits the generated first upper surface image to the processor 90, and the second camera 52 transmits the generated second upper surface image to the processor 90.

When the input object 70 is adjacent to or in contact with the upper surface 25 of the light guide plate 20 while the light source array 30 is turned on, the processor 90 controls the first camera 51 and the second camera 52 to photograph the upper surface 25 of the light guide plate 20. Then, the first camera 51 may generate a first adjacent upper surface image by capturing infrared rays emitted from the upper surface 25 of the light guide plate 20 and reflected by the input object 70, and the second camera 52 may generate a second adjacent upper surface image by capturing infrared rays emitted from the upper surface 25 of the light guide plate 20 and reflected by the input object 70.

The first camera 51 transmits the generated first adjacent upper surface image to the processor 90, and the second camera 52 transmits the generated second adjacent upper surface image to the processor 90.

The processor 90 may recognize the coordinates of the input object 70 using the first upper surface image and the first adjacent upper surface image captured by the first camera 51. In addition, the processor 90 may recognize the coordinates of the input object 70 using the second upper surface image and the second adjacent upper surface image captured by the second camera 52. The processor 90 may store the first and second upper surface images and the first and second adjacent upper surface images in the memory 91 to calculate the coordinates of the input object 70 through image processing.

In this case, because the processor 90 recognizes the coordinates of one input object 70 using images captured by two cameras, the processor 90 may accurately recognize the coordinates of the input object 70 compared to the case of using one camera.

The processor 90 may transmit the coordinates of the input object 70 recognized using the first and second upper surface images and the first and second adjacent upper surface images captured by the first camera 51 and the second camera 52 to the main processor 99.

The processor 90 may include, for example, a processing circuit such as an electronic circuit board, various electronic components such as an application specific integrated circuit (ASIC), a read only memory (ROM), a random access memory (RAM), and/or program modules.

The memory 91 may store programs for processing or control by the processor 90 and the upper surface images and the adjacent upper surface images for calculating the coordinates of the input object 70. For example, the memory 91 may store a plurality of application programs for the processor 90 to calculate the coordinates of the input object 70 using the upper surface image and the adjacent upper surface image.

The memory 91 may be accessed by the processor 90, and data reading/writing/modification/deletion/update of the memory 91 may be performed by the processor 90. The memory 91 may be implemented as a storage medium in the display panel 10, an external storage medium, a removable disk including a USB memory, a web server through a network, and the like.

In this embodiment, the processor 90 and the memory 91 may be disposed on the printed circuit board 33 on which the light source array 30 is provided.

The main processor 99 may be formed to control the display panel 10 to output an image to the display surface 11.

In addition, the main processor 99 may be configured to control the display panel 10 to perform a corresponding event according to the coordinates of the input object 70 received from the processor 90.

In the case of the embodiment shown in FIG. 3, the main processor 99 is formed separately from the processor 90. However, as another example, the processor 90 may be integrally formed with the main processor 99 configured to control the display panel 10.

Referring to FIGS. 1 and 2, the light source array 30 and the light guide plate 20 may be fixed and supported by a housing 60. The housing 60 may be formed to surround three side surfaces of the light guide plate 20 and the light source array 30 disposed at one side surface of the light guide plate 20.

The printed circuit board 33 of the light source array 30 may be disposed on the inner surface of the housing 60. Infrared rays emitted from the second side surface 22, the third side surface 23, and the fourth side surface 24 of the light guide plate 20 may be blocked or reflected by the housing 60.

The first camera 51 and the second camera 52 may be disposed on the printed circuit board 33 or in the housing 60 to photograph the entire upper surface 25 of the light guide plate 20.

Also, the housing 60 may be formed to fix and support the display panel 10. In other words, the display panel 10, the light guide plate 20, and the light source array 30 may be disposed inside one housing 60.

As another example, the display panel 10 may be implemented as a display apparatus accommodated in a separately formed housing. On the other hand, the light guide plate 20, the light source array 30, the first camera 51, the second camera 52, the processor 90, and the housing may form a touch device. In this case, when the touch device is disposed over the display surface 11 of the display apparatus, the touch display apparatus 1 according to an embodiment may be implemented.

Hereinafter, an operation of the touch display apparatus 1 according to an embodiment will be described with reference to FIGS. 4 and 5.

Figure 4:
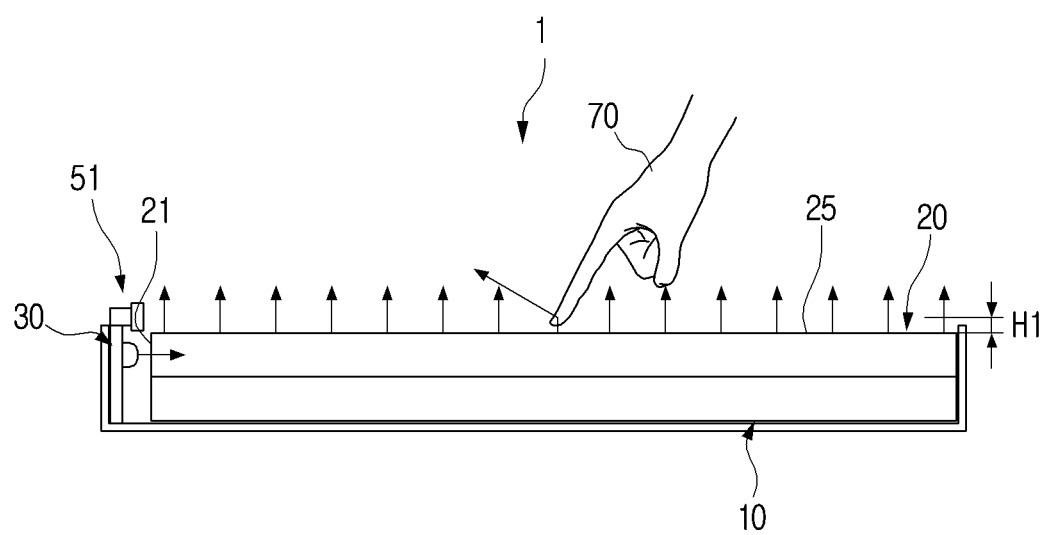
FIG. 4 is a view for explaining an operation of a touch display apparatus according to an embodiment of the disclosure.

FIG. 4 is a view for explaining an operation of a touch display apparatus according to an embodiment of the disclosure.

Figure 5:
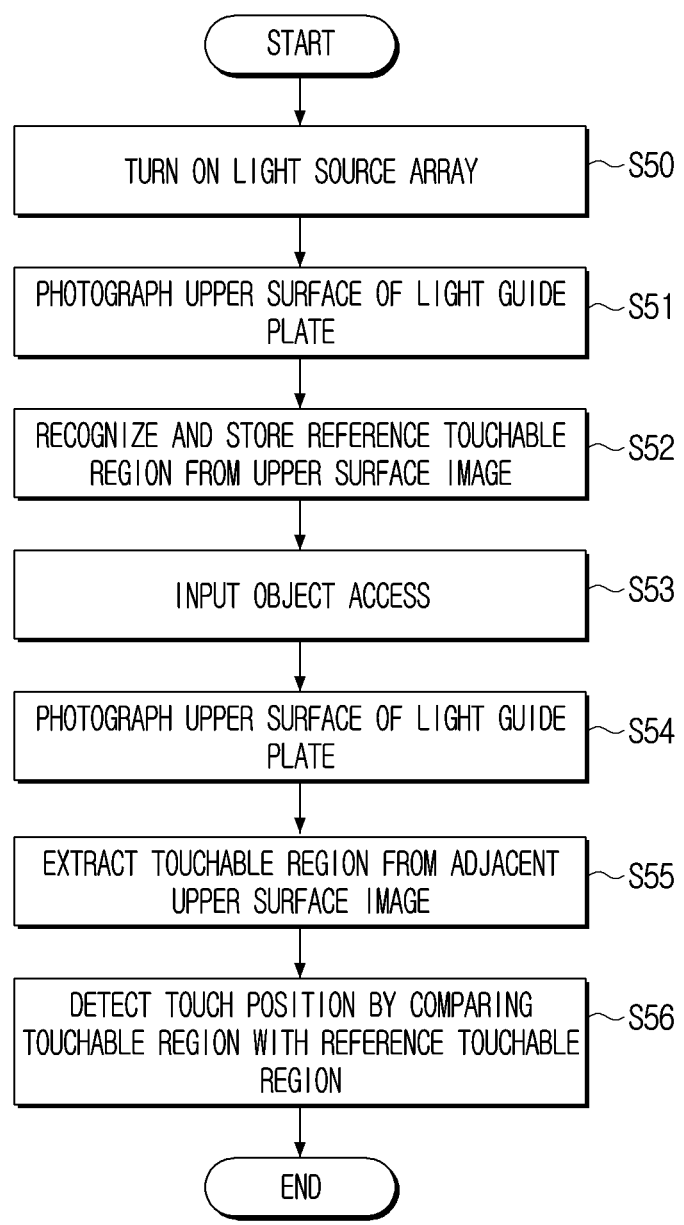
FIG. 5 is a flowchart for explaining an operation of a touch display apparatus according to an embodiment of the disclosure.

FIG. 5 is a flowchart for explaining an operation of a touch display apparatus according to an embodiment of the disclosure.

When the touch display apparatus 1 is turned on, the processor 90 performs calibration. In detail, when the touch display apparatus 1 is turned on, the processor 90 turns on the light source array 30 at operation S50, and controls each of the first camera 51 and the second camera 52 to photograph the entire upper surface 25 of the light guide plate 20 at operation S51. In other words, the processor 90 controls each of the first camera 51 and the second camera 52 to capture infrared rays emitted from the upper surface 25 of the light guide plate 20, thereby generating a first upper surface image and a second upper surface image.

The processor 90 receives the first upper surface image captured by the first camera 51 and the second upper surface image captured by the second camera 52. The processor 90 recognizes a region corresponding to the upper surface 25 of the light guide plate 20, i.e. a region emitting infrared rays from the first upper surface image and the second upper surface image, and stores the region in the memory 91 as a reference touchable region at operation S52.

As illustrated in FIG. 4, when a finger (i.e., input object 70) is adjacent to input to the display panel 10 at operation S53, infrared rays emitted from the upper surface 25 of the light guide plate 20 are reflected by the finger (i.e., input object 70).

At this time, the processor 90 controls the first camera 51 and the second camera 52 to photograph the entire upper surface 25 of the light guide plate 20 at operation S54. Then, an adjacent upper surface image including infrared rays emitted from the upper surface 25 of the light guide plate 20 and infrared rays reflected by the finger (i.e., input object 70) is generated.

In detail, the first camera 51 generates a first adjacent upper surface image by capturing infrared rays emitted from the upper surface 25 of the light guide plate 20 and infrared rays reflected by the finger (i.e., input object 70) and transmits the first adjacent upper surface image to the processor 90. The second camera 52 generates a second adjacent upper surface image by capturing infrared rays emitted from the upper surface 25 of the light guide plate 20 and infrared rays reflected by the finger (i.e., input object 70) and transmits the second adjacent upper surface image to the processor 90.

The processor 90 extracts a touchable region from the transmitted adjacent upper surface images at operation S55. Next, the processor 90 compares the extracted touchable region with the reference touchable region stored in the memory 91 to calculate the position of the input object 70 at operation S56.

In detail, the processor 90 extracts an image of a region corresponding to the upper surface 25 of the light guide plate 20 as a first touchable region from the transmitted first adjacent upper surface image. Next, the processor 90 compares the first touchable region with the reference touchable region stored in the memory 91 to calculate first coordinates at which the tip of the finger (i.e., input object 70) is located.

In addition, the processor 90 extracts an image of a region corresponding to the upper surface 25 of the light guide plate 20 as a second touchable region from the transmitted second adjacent upper surface image. Next, the processor 90 compares the second touchable region with the reference touchable region stored in the memory 91 to calculate second coordinates at which the tip of the finger (i.e., input object 70) is located. In this case, because the finger (i.e., input object 70) is positioned at an arbitrary point over the light guide plate 20, the first coordinates and the second coordinates calculated by the processor 90 are the same.

The touch display apparatus 1 according to an embodiment may recognize the coordinates of the tip of the input object 70 in a state that the tip of the input object 70 does not directly touch the upper surface 25 of the light guide plate 20 and is spaced apart from the upper surface 25 of the light guide plate 20 by a predetermined distance. This may be referred to as spatial touch. In FIG. 4, H1 denotes a spatial touch height, which is the distance from the upper surface 25 of the light guide plate 20 to the tip of the input object 70 capable of spatial touch.

As described above, because the touch display apparatus 1 according to an embodiment recognizes the coordinates of the input object 70 using two cameras, that is, the first camera 51 and the second camera 52, even when one of the two cameras 51 and 52 does not recognize the input object 70, the coordinates of the input object 70 may be recognized. Accordingly, the touch display apparatus 1 according to an embodiment may minimize an error of not recognizing the coordinates of the input object 70 compared to the case of using one camera.

The touch display apparatus 1 configured to calculate the coordinates of the input object 70 using the two cameras 51 and 52 has been described above; however, the touch display apparatus according to an embodiment is not limited thereto.

Figure 6:
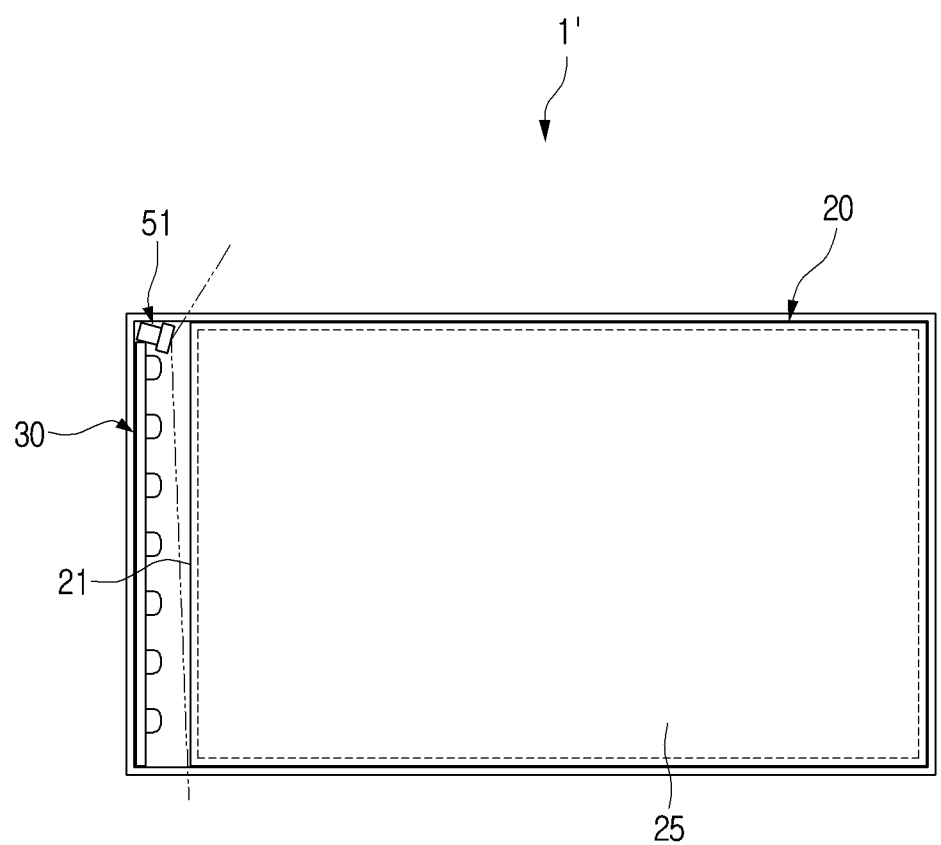
FIG. 6 is a plan view illustrating a touch display apparatus according to an embodiment of the disclosure.

A touch display apparatus 1' according to an embodiment may include only one camera 51 as illustrated in FIG. 6.

FIG. 6 is a plan view illustrating a touch display apparatus according to an embodiment of the disclosure.

Referring to FIG. 6, a touch display apparatus 1' according to an embodiment may include a display panel 10, a light guide plate 20, a light source array 30, a camera 51, and a processor 90.

The touch display apparatus 1' as illustrated in FIG. 6 is the same as the touch display apparatus 1 according to the above-described embodiment, except that one camera 51 is disposed to photograph the entire area of the upper surface 25 of the light guide plate 20. Therefore, a detailed description thereof is omitted.

In the case of the embodiment shown in FIG. 6, the processor 90 may be configured to photograph an upper surface image and an adjacent upper surface image using the single camera 51 and to calculate the coordinates of the input object 70 using the upper surface image and the adjacent upper surface image.

The touch display apparatus 1' having one camera 51 as illustrated in FIG. 6 may be more likely to cause an error in which the coordinates of the input object 70 cannot be calculated than the touch display apparatus 1 having two cameras 51 and 52 as in the above-described embodiment.

Hereinafter, a touch display apparatus according to another embodiment will be described in detail with reference to FIGS. 7 to 9.

Figure 7:
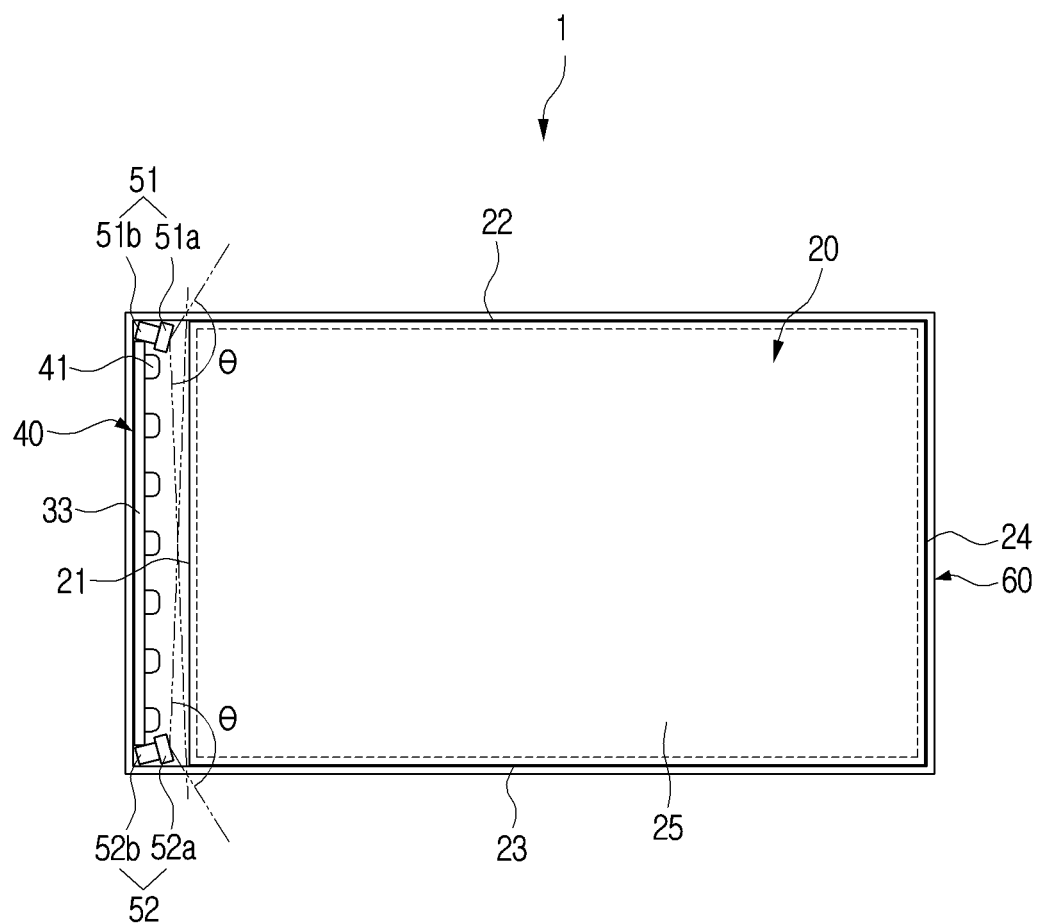
FIG. 7 is a plan view illustrating a touch display apparatus according to an embodiment of the disclosure.

FIG. 7 is a plan view illustrating a touch display apparatus according to an embodiment of the disclosure.

Figure 8:
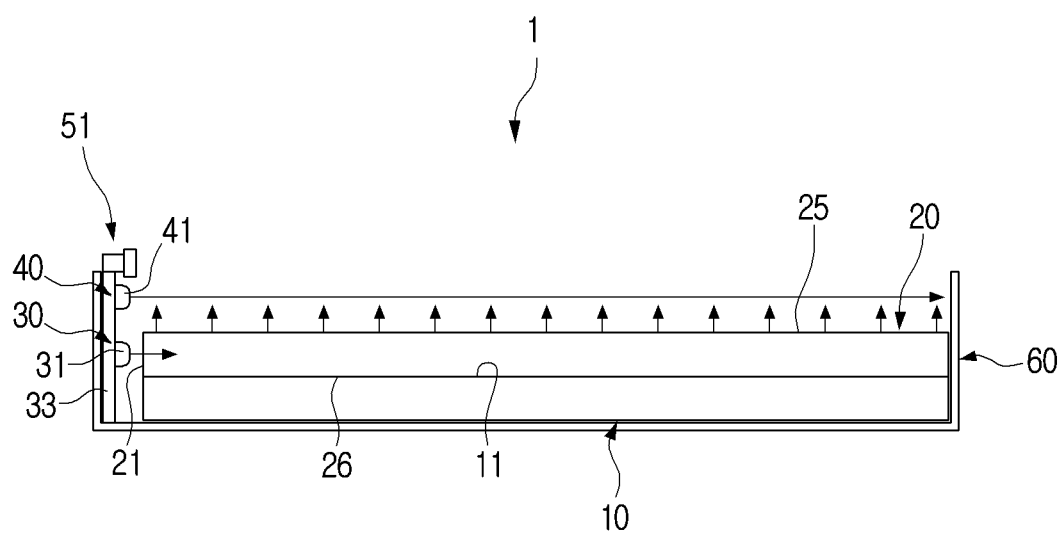
FIG. 8 is a cross-sectional view illustrating a touch display apparatus according to an embodiment of the disclosure.

FIG. 8 is a cross-sectional view illustrating a touch display apparatus according to an embodiment of the disclosure.

Figure 9:
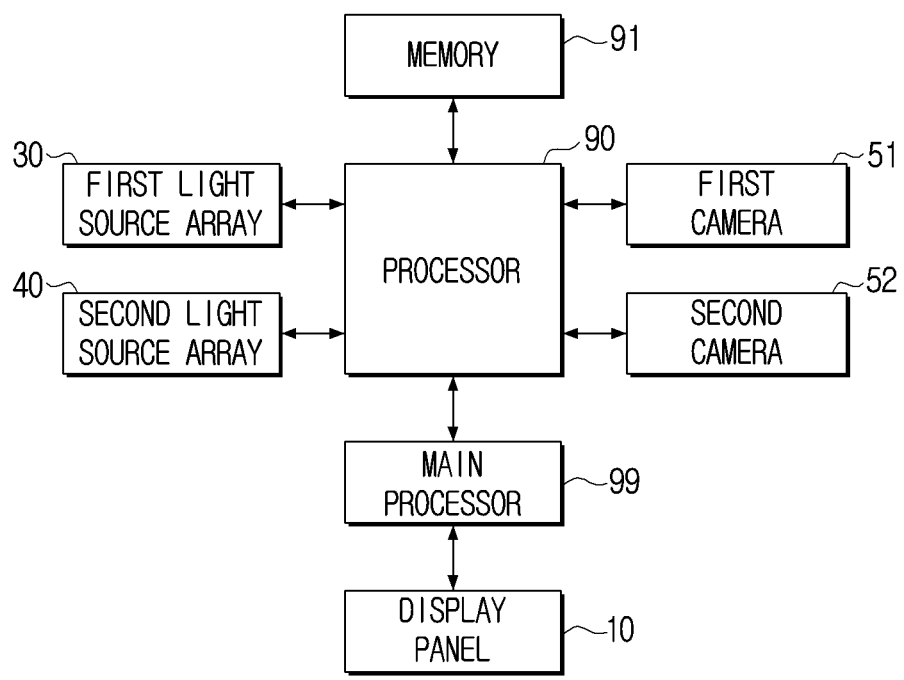
FIG. 9 is a functional block diagram of a touch display apparatus according to an embodiment of the disclosure.

FIG. 9 is a functional block diagram of a touch display apparatus according to an embodiment of the disclosure.

Referring to FIGS. 7 to 9, a touch display apparatus 1 according to an embodiment may include a display panel 10, a light guide plate 20, light source arrays 30 and 40, cameras 51 and 52, and a processor 90.

The display panel 10 may be configured to display an image. The display panel 10 may be formed in a substantially rectangular flat plate shape. The display panel 10 may include a display surface 11 on which an image is displayed.

The display panel 10 may be implemented in various types. For example, the display panel 10 may include various types of display panels such as a liquid crystal display (LCD) panel, an organic light emitting diode (OLED) panel, a quantum dot light emitting diode (QLED) panel, a micro LED panel, etc. The display panel 10 may use a display panel according to the related art; therefore, a detailed description thereof is omitted.

Referring to FIG. 8, the light guide plate 20 may be disposed over the display panel 10. In detail, the light guide plate 20 may be disposed over the display surface 11 of the display panel 10.

The light guide plate 20 may be formed in a rectangular flat plate shape, and may include a first surface (i.e., upper surface 25), a second surface 26 facing the first surface (i.e., upper surface 25), and four side surfaces. In detail, the first surface (i.e., upper surface 25) and the second surface 26 are formed in a rectangular shape and face each other in parallel. The first surface (i.e., upper surface 25) may form the upper surface of the light guide plate 20 and the second surface 26 may form the lower surface of the light guide plate 20.

The four side surfaces may include a first side surface 21, a second side surface 22, a third side surface 23, and a fourth side surface 24 connecting the first surface (i.e., upper surface 25) and the second surface 26. The second side surface 22 and the third side surface 23 are perpendicular to the first side surface 21 and parallel to each other. The fourth side surface 24 is parallel to the first side surface 21 and perpendicular to the second side surface 22 and the third side surface 23.

The display panel 10 is disposed in the lower surface (i.e., second surface 26) of the light guide plate 20, that is, the second surface 26 of the light guide plate 20. The lower surface (i.e., second surface 26) of the light guide plate 20 may be disposed to face the display surface 11 of the display panel 10. The light guide plate 20 may be formed to be larger than the size of the display surface 11 of the display panel 10.

The light guide plate 20 may be formed to emit light, which is incident on one side surface of the light guide plate 20, through the upper surface 25. For example, the light guide plate 20 may be formed to emit infrared rays, which are incident on the first side surface 21 of the light guide plate 20, to the outside through the upper surface 25, that is, the first surface (i.e., upper surface 25).

The second surface 26 and the third side surface 23 perpendicular to the first side surface 21 of the light guide plate 20 may be formed so that infrared rays incident on the first side surface 21 are not emitted to the outside through the second side surface 22 and the third side surface 23. For example, the inner surface of the second side surface 22 and the inner surface of the third side surface 23 may be formed to reflect or block infrared rays.

Alternatively, the second side surface 22 and the third side surface 23 of the light guide plate 20 may be formed to transmit infrared rays, and a blocking plate configured to block infrared rays or a reflecting plate configured to reflect infrared rays may be disposed on each of the second side surface 22 and the third side surface 23. The blocking plate and the reflecting plate may be implemented as an inner surface of the housing 60 to be described later.

In addition, the fourth side surface 24 facing and parallel to the first side surface 21 may be formed so that infrared rays incident on the first side surface 21 are not emitted to the outside through the fourth side surface 24.

When the second side surface 22, the third side surface 23, and the fourth side surface 24 of the light guide plate 20 are formed such that infrared rays are not emitted therethrough, the infrared rays incident on the first side surface 21 are not emitted through the second side surface 22, the third side surface 23, and the fourth side surface 24, but only through the first surface (i.e., upper surface 25).

Accordingly, when the camera photographs the upper surface 25 of the light guide plate 20, the processor 90 may recognize a region of the upper surface 25 of the light guide plate 20 from the infrared image of the light guide plate 20 captured by the camera. In other words, the processor 90 may recognize the touchable region from an infrared image obtained by capturing the upper surface 25 of the light guide plate 20. That is, the processor 90 may recognize the entire area of the upper surface 25 of the light guide plate 20 from which infrared rays are emitted as the touchable region.

The light guide plate 20 may be formed of a transparent material through which infrared rays pass. For example, the light guide plate 20 may be formed of transparent plastic, transparent resin, or the like. Accordingly, the image displayed on the display surface 11 of the display panel 10 may be view by the user through the light guide plate 20.

The light source array may be formed to emit infrared rays. The light source array may be disposed on one side of the light guide plate 20. For example, the light guide plate may be disposed adjacent to the first side surface 21 of the light guide plate 20.

The light source array may include a first light source array 30 and a second light source array 40.

The first light source array 30 may include a plurality of infrared light sources 31, and may be disposed adjacent to the first side surface 21 of the light guide plate 20. Alternatively, the first light source array 30 may be disposed to contact the first side surface 21 of the light guide plate 20. Accordingly, infrared rays emitted from the first light source array 30 may be incident into the light guide plate 20 through the first side surface 21 of the light guide plate 20.

The plurality of infrared light sources 31 of the first light source array 30 may be arranged in a straight line along the first side surface 21 of the light guide plate 20. The plurality of infrared light sources 31 of the first light source array 30 may be disposed on a printed circuit board 33. The printed circuit board 33 may be disposed in parallel with the first side surface 21 of the light guide plate 20. The plurality of infrared light sources 31 may be provided in a straight line on one surface of the printed circuit board 33 facing the first side surface 21 of the light guide plate 20.

Accordingly, infrared rays emitted from the first light source array 30 may be incident on the first side surface 21 of the light guide plate 20, and then may be emitted through the first surface (i.e., upper surface 25), that is, the upper surface of the light guide plate 20. When some of infrared rays leaks from the lower surface (i.e., second surface 26) of the light guide plate 20, the leaked infrared rays may be reflected by the display surface 11 of the display panel 10, incident on the lower surface (i.e., second surface 26) of the light guide plate 20, and emitted to the outside through the upper surface 25 of the light guide plate 20.

The second light source array 40 may include a plurality of infrared light sources 41, and may be disposed above the first light source array 30. In other words, the second light source array 40 may be disposed above the first side surface 21 of the light guide plate 20 adjacent to which the first light source array 30 is disposed. Accordingly, the second light source array 40 is positioned above the upper surface 25 of the light guide plate 20.

Accordingly, infrared rays emitted from the second light source array 40 may not be incident into the light guide plate 20, but may move toward the upper side of the light guide plate 20. In other words, infrared rays emitted from the second light source array 40 may move over the upper surface 25 of the light guide plate 20 in a direction parallel to the upper surface 25 of the light guide plate 20.

The plurality of infrared light sources 41 of the second light source array 40 may be arranged in a straight line in parallel with the plurality of infrared light sources 31 of the first light source array 30. The plurality of infrared light sources 41 of the second light source array 40 may be disposed on the printed circuit board 33 on which the first light source array 30 is disposed.

The plurality of infrared light sources 41 of the second light source array 40 may be provided in a straight line parallel to the plurality of infrared light sources 31 of the first light source array 30 on one surface of the printed circuit board 33 on which the first light source array 30 is disposed. The second light source array 40 may be disposed on the printed circuit board 33 to be spaced apart from the first light source array 30 by a predetermined distance.

The plurality of infrared light sources 41 of the second light source array 40 may be disposed so that infrared rays emitted from the plurality of infrared light sources 41 cover the entire area of the upper surface 25 of the light guide plate 20. For example, as illustrated in FIG. 10B, the second light source array 40 may be formed such that the region of infrared rays emitted from the plurality of infrared light sources 41 is larger than the area of the upper surface 25 of the light guide plate 20.

Figure 10A:
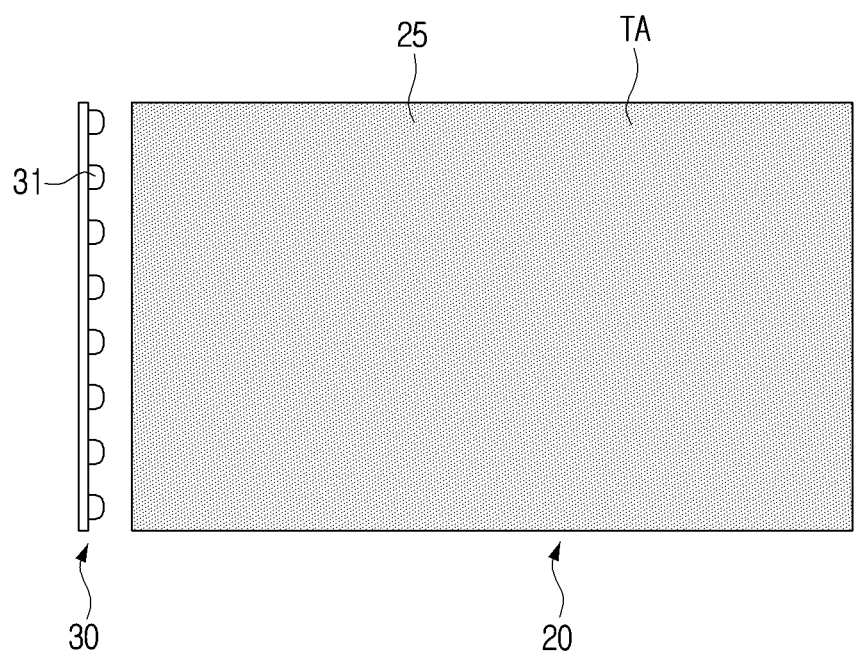
FIG. 10A is a view illustrating a region of infrared rays emitted from a first light source array according to an embodiment of the disclosure.

FIG. 10A is a view illustrating a region of infrared rays emitted from a first light source array according to an embodiment of the disclosure.

Figure 10B:
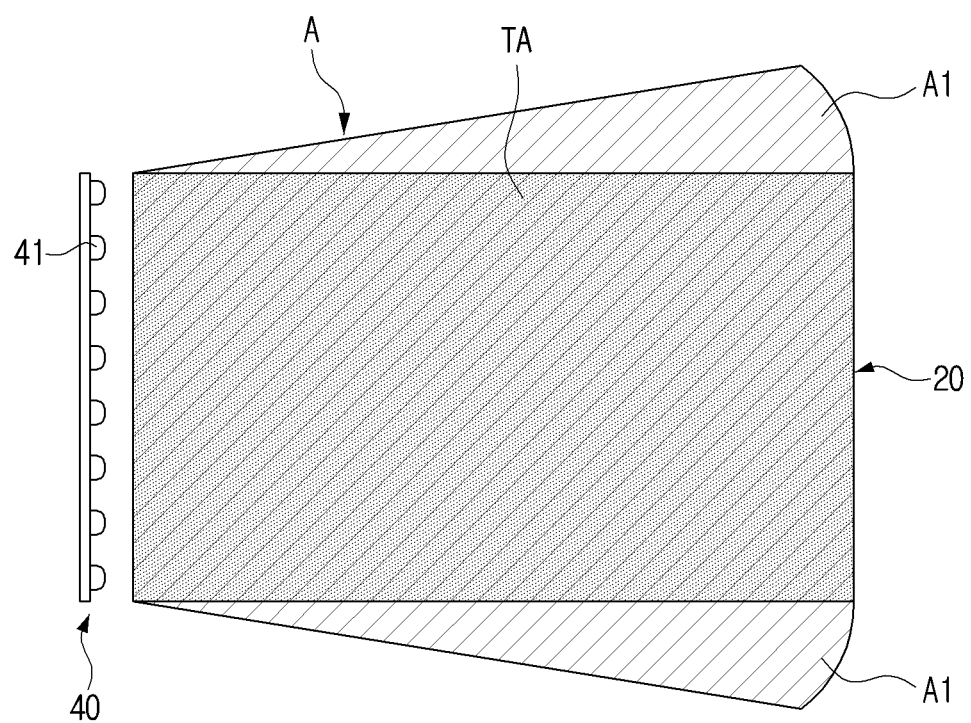
FIG. 10B is a view illustrating a region of infrared rays emitted from a first light source array and a region of infrared rays emitted from a second light source array according to an embodiment of the disclosure.

FIG. 10B is a view illustrating a region of infrared rays emitted from a first light source array and a region of infrared rays emitted from a second light source array according to an embodiment of the disclosure.

Referring to FIG. 10A, infrared rays emitted from the first light source array 30 are incident into the light guide plate 20 through the first side surface 21 of the light guide plate 20 and emitted to the outside through the upper surface 25 of the light guide plate 20. In this case, because the second side surface 22, the third side surface 23, and the fourth side surface 24 of the light guide plate 20 are formed so that infrared rays are not emitted therethrough, the region of infrared rays emitted from the first light source array 30 (TA) is defined by the upper surface 25 of the light guide plate 20. This region TA corresponds to the touchable region.

The plurality of infrared light sources 41 of the second light source array 40 may be formed to emit infrared rays in a direction parallel to the light guide plate 20 toward the upper side of the light guide plate 20 and to be larger than the area of the upper surface 25 of the light guide plate 20.

Infrared rays emitted from the infrared light sources 41 may be spread at a predetermined angle rather than parallel light. In other words, the infrared rays emitted from the infrared light sources 41 may have a substantially conical shape. Therefore, as illustrated in FIG. 10B, a portion A1 of the region of infrared rays emitted from each of the two infrared light sources 41 disposed at both ends of the second light source array 40 may be beyond the light guide plate 20.

Accordingly, infrared rays emitted from the first light source array 30 may be incident on the first side surface 21 of the light guide plate 20 and emitted through the first surface (i.e., upper surface 25), that is, the upper surface of the light guide plate 20. Infrared rays emitted from the second light source array 40 may be emitted in a direction substantially parallel to the light guide plate 20 toward the upper side of the upper surface 25 of the light guide plate 20.

The touch display apparatus 1 according to an embodiment may limit the region A of infrared rays emitted from the second light source array 40 by using the infrared rays region TA defined by the first light source array 30 and the light guide plate 20. In other words, as illustrated in FIG. 10B, excluding the infrared ray regions A1 that are beyond the light guide plate 20 in the region A of infrared rays emitted from the second light source array 40, a portion overlapping the region of infrared rays emitted from the upper surface 25 of the light guide plate 20 may be recognized as the touchable region TA.

The plurality of infrared light sources 31 and 41 constituting the first light source array 30 and the second light source array 40 may be formed of infrared light emitting diodes (LEDs).

The cameras 51 and 52 may be configured to photograph infrared rays emitted from the light guide plate 20 and the second light source array 40. The cameras 51 and 52 may be provided to photograph the entire upper surface 25 of the light guide plate 20. In detail, the cameras 51 and 52 may be configured to capture infrared rays emitted through the entire area of the upper surface 25 of the light guide plate 20 and infrared rays emitted from the second light source array 40 toward the upper side of the light guide plate 20.

To this end, each of the cameras 51 and 52 may include a wide-angle lens and an image sensor. The wide-angle lens has an angle of view capable of capturing the entire upper surface 25 of the light guide plate 20. For example, the angle of view of the wide-angle lens may be greater than or equal to 90 degrees.

The image sensor may be configured to generate an image of incident infrared rays. For example, when the first and second light source arrays 30 and 40 emit infrared rays, the image sensor may capture infrared rays emitted through the entire area of the upper surface 25 of the light guide plate 20 to generate an upper surface image.

The cameras 51 and 52 may be disposed on one side of the second light source array 40. However, the positions of the cameras 51 and 52 are not limited thereto. As long as the cameras 51 and 52 can photograph the entire upper surface 25 of the light guide plate 20, they may be disposed in any position.

As illustrated in FIG. 7, the camera may include a first camera 51 and a second camera 52.

The first camera 51 may be disposed on one side of the second light source array 40, and may be provided to photograph the entire area of the upper surface 25 of the light guide plate 20. The first camera 51 may include a wide-angle lens 51a and an image sensor 51b to photograph infrared rays that are emitted from the first light source array 30 and are upwardly emitted through the entire area of the upper surface 25 of the light guide plate 20 and infrared rays emitted from the second light source array 40 toward the upper side of the upper surface 25 of the light guide plate 20.

The second camera 52 may be disposed on the other side of the second light source array 40 opposite to the first camera 51, and may be provided to photograph the entire area of the upper surface 25 of the light guide plate 20. The second camera 52 may include a wide-angle lens 52a and an image sensor 52b to photograph infrared rays that are emitted from the first light source array 30 and are upwardly emitted through the entire area of the upper surface 25 of the light guide plate 20 and infrared rays emitted from the second light source array 40 toward the upper side of the upper surface 25 of the light guide plate 20.

As illustrated in FIG. 7, the angle of view of each of the wide-angle lens 51a of the first camera 51 and the wide-angle lens 52a of the second camera 52 may be 90 degrees or more.

Figure 11:
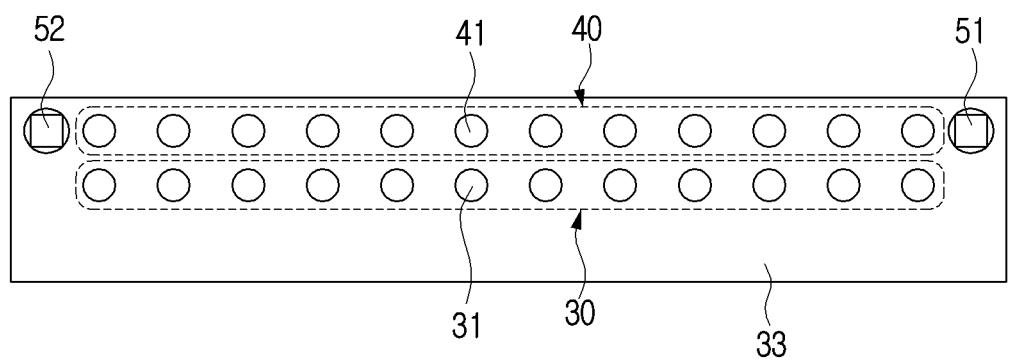
FIG. 11 is a view illustrating a printed circuit board on which a first camera and a second camera used in a touch display apparatus according to an embodiment of the disclosure are disposed.

The first camera 51 and the second camera 52 may be disposed on both sides of the second light source array 40 on the printed circuit board 33 as illustrated in FIG. 11.

FIG. 11 is a view illustrating a printed circuit board on which a first camera and a second camera used in a touch display apparatus according to an embodiment of the disclosure are disposed.

Referring to FIG. 11, the plurality of infrared light sources 31 of the first light source array 30 and the plurality of infrared light sources 41 of the second light source array 40 are disposed in two rows on the printed circuit board 33 in parallel.

In addition, the first camera 51 is disposed on the printed circuit board 33 to the left of the second light source array 40, and the second camera 52 is disposed on the printed circuit board 33 to the right side of the second light source array 40. In this case, the first camera 51 and the second camera 52 are respectively disposed on the printed circuit board 33 to photograph the entire area of the upper surface 25 of the light guide plate 20.

The first camera 51 and the second camera 52 may capture the upper surface 25 of the light guide plate 20 to generate an image, respectively. In this way, when the two cameras 51 and 52 are configured to generate an image of the upper surface 25 of the light guide plate 20, respectively, the coordinates of an input object 70 contacting or adjacent to the light guide plate 20 may be accurately calculated.

The processor 90 may be configured to recognize the coordinates of the input object 70 contacting or adjacent to the light guide plate 20 using the images captured by the first camera 51 and the second camera 52. The processor 90 may transmit the recognized coordinates of the input object 70 to a main processor 99. The coordinates of the input object 70 recognized by the processor 90 refers to two-dimensional coordinates at which the tip of the input object 70 is located on the display surface 11. In other words, the coordinates of the input object 70 are two-dimensional coordinates based on the display surface 11.

The processor 90 may be configured to control on/off of each of the first light source array 30 and the second light source array 40. In addition, the processor 90 may turn on the first light source array 30 and the second light source array 40, control the cameras 51 and 52 to photograph infrared rays emitted through the upper surface 25 of the light guide plate 20 when the input object 70 is not adjacent to the upper surface 25 of the light guide plate 20 so as to generate upper surface images, and receive the upper surface images generated by the cameras 51 and 52 from the cameras 51 and 52.

The processor 90 may recognize and store an image of a region corresponding to the entire area of the upper surface 25 of the light guide plate 20 through which infrared rays are emitted from the upper surface images received from the first and second cameras 51 and 52 as a reference touchable region.

In addition, the processor 90 may control the first and second cameras 51 and 52 to photograph infrared rays emitted from the upper surface 25 of the light guide plate 20 and infrared rays reflected by the input object 70 so as to generate adjacent upper surface images when the input object 70 is adjacent to or in contact with the light guide plate 20 while the first light source array 30 and the second light source array 40 are turned on, and receive the adjacent upper surface images generated by the first and second cameras 51 and 52.

The case that the input object 70 is adjacent to the light guide plate 20 refers to the case that the input object 70 is located close to the upper surface 25 of the light guide plate 20 to such an extent that the first and second cameras 51 and 52 can photograph infrared rays that are emitted from the first and second light source arrays 30 and 40 and reflected by the input object 70. Accordingly, the case that the input object 70 is adjacent to the light guide plate 20 may include the case that the input object 70 is in contact with the upper surface 25 of the light guide plate 20 and the case that the input object 70 is close to the upper surface 25 of the light guide plate 20 without contacting the upper surface 25.

The processor 90 may be configured to recognize the coordinates of the input object 70 using the upper surface images and the adjacent upper surface images captured by the first and second cameras 51 and 52. A image processing technology of the related art may be used as the image processing technology in which the processor 90 recognizes the coordinates of the input object 70 by using images, and thus a detailed description thereof is omitted.

The processor 90 may transmit the coordinates of the input object 70 recognized using the upper surface image and the adjacent upper surface image to the main processor 99.

In detail, the processor 90 turns on the first light source array 30 and controls the first camera 51 and the second camera 52 to photograph the upper surface 25 of the light guide plate 20 before the input object 70 is adjacent to the light guide plate 20. Then, the first camera 51 may generate a first upper surface image by capturing infrared rays emitted from the upper surface 25 of the light guide plate 20, and the second camera 52 may generate a second upper surface image by capturing infrared rays emitted from the upper surface 25 of the light guide plate 20.

The first camera 51 transmits the generated first upper surface image to the processor 90, and the second camera 52 transmits the generated second upper surface image to the processor 90.

Then, the processor 90 extracts images of an area in which infrared rays are detected (that is, an area corresponding to the upper surface 25 of the light guide plate 20) from the received first upper surface image and the received second upper surface image, recognizes the images as the touchable region, and stores the images in the memory 91 as the reference touchable region.

Thereafter, the processor 90 turns on the second light source array 40.

When the input object 70 is adjacent to or in contact with the upper surface 25 of the light guide plate 20 while the first and second light source arrays 30 and 40 are turned on, the processor 90 controls the first camera 51 and the second camera 52 to photograph the upper surface 25 of the light guide plate 20.

Then, the first camera 51 may generate a first adjacent upper surface image by capturing infrared rays emitted from the upper surface 25 of the light guide plate 20 and infrared rays reflected by the input object 70, and the second camera 52 may generate a second adjacent upper surface image by capturing the infrared rays emitted from the upper surface 25 of the light guide plate 20 and infrared rays reflected by the input object 70.

In this case, the first adjacent upper surface image and the second adjacent upper surface image are images obtained by the first and second cameras 51 and 52 respectively capturing a state in which infrared rays that are emitted from the first light source array 30 and emitted though the upper surface 25 of the light guide plate 20 and infrared rays emitted from the second light source array 40 are reflected by the input object 70.

The first camera 51 transmits the generated first adjacent upper surface image to the processor 90, and the second camera 52 transmits the generated second adjacent upper surface image to the processor 90.

The processor 90 may recognize the coordinates of the input object 70 using the reference touchable region and the first adjacent upper surface image captured by the first camera 51. In addition, the processor 90 may recognize the coordinates of the input object 70 using the reference touchable region and the second adjacent upper surface image captured by the second camera 52.

When the processor 90 recognizes the coordinates of the input object 70, the processor 90 extracts a touchable region TA corresponding to the upper surface 25 of the light guide plate 20 by removing the areas A1 that are beyond the light guide plate 20, that is, the portions outside the touchable region TA, from the first adjacent upper surface image captured by the first camera 51. Thereafter, the processor 90 may detect the coordinates of the input object 70 by comparing the touchable region extracted from the first adjacent upper surface image with the reference touchable region stored in the memory 91.

In addition, the processor 90 extracts a touchable region TA corresponding to the upper surface 25 of the light guide plate 20 by removing the areas A1 that are beyond the light guide plate 20, that is, the portions outside the touchable region TA, from the second adjacent upper surface image captured by the second camera 52. Thereafter, the processor 90 may detect the coordinates of the input object 70 by comparing the touchable region extracted from the second adjacent upper surface image with the reference touchable region stored in the memory 91.

The processor 90 may store the first and second upper surface images and the first and second adjacent upper surface images in the memory 91 to calculate the coordinates of the input object 70 through image processing.

Because the processor 90 recognizes the coordinates of one input object 70 using images captured by two cameras 51 and 52, the processor 90 may accurately recognize the coordinates of the input object 70 compared to the case of using one camera.

In addition, because the processor 90 recognizes the coordinates of the input object 70 using the touchable region TA corresponding to the upper surface 25 of the light guide plate 20, an error in which the processor 90 incorrectly recognizes the coordinates of the input object 70 due to infrared rays reflected from the outside of the light guide plate 20 may be prevented.

The processor 90 may transmit the coordinates of the input object 70 recognized using the first and second upper surface images and the first and second adjacent upper surface images captured by the first camera 51 and the second camera 52 to the main processor 99.

The processor 90 may include, for example, a processing circuit such as an electronic circuit board, various electronic components such as an application specific integrated circuit (ASIC), a read only memory (ROM), a random access memory (RAM), and the like, and/or program modules.

The memory 91 may store programs for processing or control by the processor 90 and the upper surface image and the adjacent upper surface image for calculating the coordinates of the input object 70. For example, the memory 91 may store a plurality of application programs for the processor 90 to calculate the coordinates of the input object 70 using the first and second upper surface images and the first and second adjacent upper surface images.

The memory 91 may be accessed by the processor 90, and data reading/writing/modification/deletion/update of the memory 91 may be performed by the processor 90. The memory 91 may be implemented as a storage medium in the display panel 10, an external storage medium, a removable disk including a USB memory, a web server through a network, and the like.

In this embodiment, the processor 90 and the memory 91 may be disposed on the printed circuit board 33 on which the first and second light source arrays 30 and 40 are provided.

The main processor 99 may be configured to control the display panel 10 to output an image to the display surface 11.

In addition, the main processor 99 may be configured to control the display panel 10 to perform a corresponding event according to the coordinates of the input object 70 received from the processor 90.

In the case of the embodiment shown in FIG. 9, the main processor 99 is formed separately from the processor 90. However, as another example, the processor 90 may be integrally formed with the main processor 99 configured to control the display panel 10.

Referring to FIGS. 7 and 8, the printed circuit board 33 on which the first light source array 30 and the second light source array 40 are disposed and the light guide plate 20 may be fixed and supported by a housing 60. The housing 60 may be formed to surround three side surfaces of the light guide plate 20 and the printed circuit board 33 disposed at one side surface of the light guide plate 20.

The printed circuit board 33 may be disposed on the inner surface of the housing 60. Infrared rays emitted from the second side surface 22, the third side surface 23, and the fourth side surface 24 of the light guide plate 20 may be blocked or reflected by the housing 60.

The first camera 51 and the second camera 52 may be disposed on the printed circuit board 33 or the housing 60 to capture infrared rays emitted from the entire upper surface 25 of the light guide plate 20 and the second light source array 40.

Also, the housing 60 may be formed to fix and support the display panel 10. In other words, the display panel 10, the light guide plate 20, and the printed circuit board 33 may be disposed inside one housing 60.

Hereinafter, an operation of the touch display apparatus 1 according to an embodiment will be described with reference to FIGS. 12 and 13.

Figure 12:
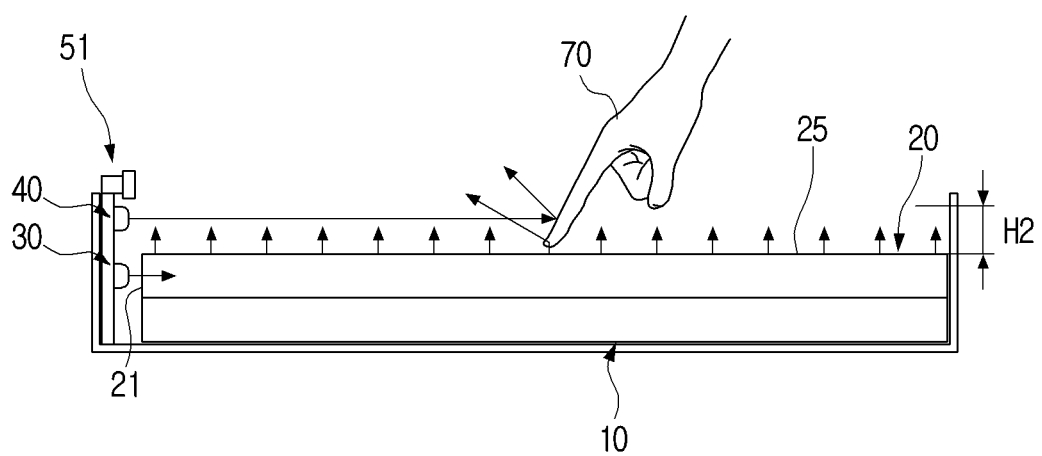
FIG. 12 is a view for explaining an operation of a touch display apparatus according to an embodiment of the disclosure.

FIG. 12 is a view for explaining an operation of a touch display apparatus according to an embodiment of the disclosure.

Figure 13:
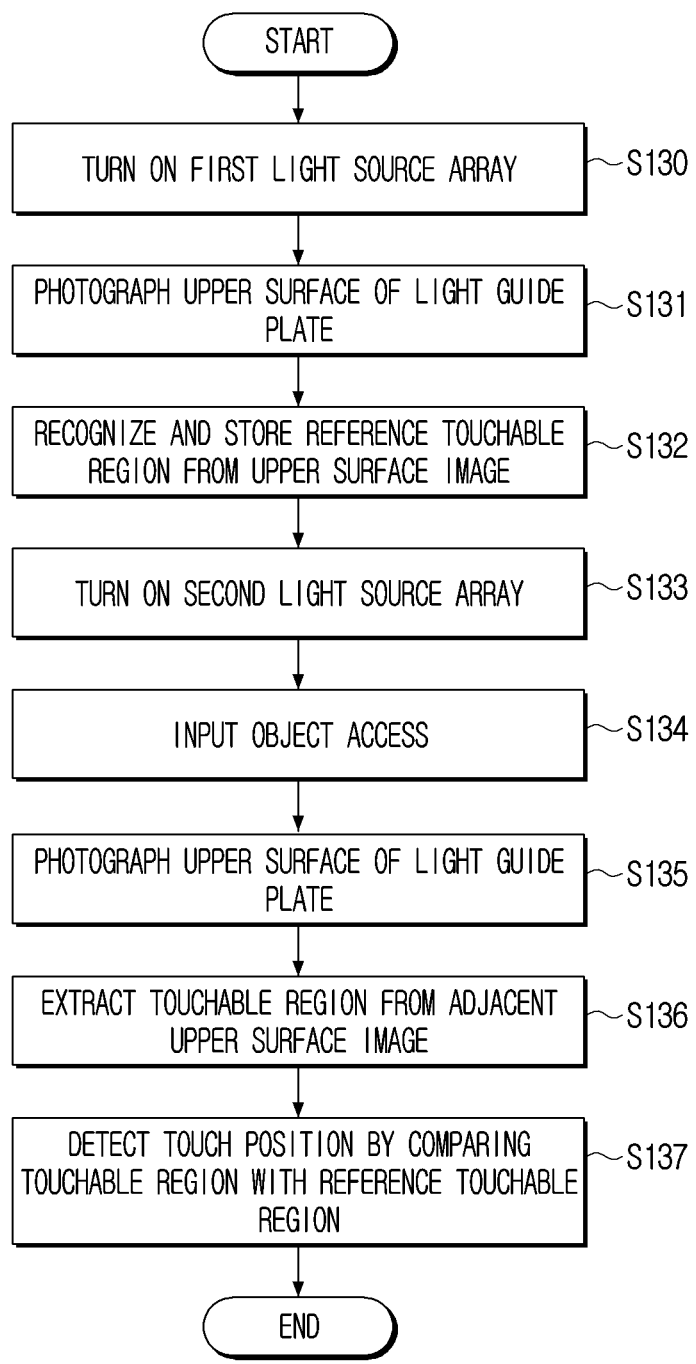
FIG. 13 is a flowchart for explaining an operation of a touch display apparatus according to an embodiment of the disclosure.

FIG. 13 is a flowchart for explaining an operation of a touch display apparatus according to an embodiment of the disclosure.

When the touch display apparatus 1 is turned on, the processor 90 performs calibration. In detail, when the touch display apparatus 1 is turned on, the processor 90 turns on the first light source array 30 at operation S130, and controls the first camera 51 and the second camera 52, respectively, to photograph the entire upper surface 25 of the light guide plate 20 at operation S131. In other words, the processor 90 controls each of the first camera 51 and the second camera 52 to capture infrared rays emitted from the upper surface 25 of the light guide plate 20, thereby generating a first upper surface image and a second upper surface image.

The processor 90 receives the first upper surface image captured by the first camera 51 and the second upper surface image captured by the second camera 52. The processor 90 extracts an image of a region corresponding to the upper surface 25 of the light guide plate 20, that is, a region from which infrared rays are emitted, from each of the first upper surface image and the second upper surface image, and recognizes the region as a touchable region TA (see FIG. 10A). The processor 90 stores the image of the touchable region in the memory 91 as a reference touchable region at operation S132.

Next, the processor 90 turns on the second light source array 40 at operation S133. Then, infrared rays emitted from the second light source array 40 move toward the upper side of the upper surface 25 of the light guide plate 20.

As illustrated in FIG. 12, when a finger (i.e., input object 70) is adjacent to input to the display panel 10 at operation S134, infrared rays emitted from the first and second light source arrays 30 and 40 are reflected by the finger (i.e., input object 70). In other words, infrared rays that are emitted from the first light source array 30 and then emitted through the upper surface 25 of the light guide plate 20 and infrared rays emitted from the second light source array 40 toward the upper side of the upper surface 25 of the light guide plate 20 are reflected by the finger (i.e., input object 70).

At this time, the processor 90 controls the first camera 51 and the second camera 52 to photograph the entire upper surface 25 of the light guide plate 20 at operation S135. Then, an adjacent upper surface image including infrared rays emitted from the upper surface 25 of the light guide plate 20 and infrared rays reflected by the finger (i.e., input object 70) is generated.

In detail, the first camera 51 generates a first adjacent upper surface image by capturing infrared rays emitted from the upper surface 25 of the light guide plate 20 and infrared rays reflected by the finger (i.e., input object 70) and transmits the first adjacent upper surface image to the processor 90. The second camera 52 generates a second adjacent upper surface image by capturing infrared rays emitted from the upper surface 25 of the light guide plate 20 and infrared rays reflected by the finger (i.e., input object 70) and transmits the second adjacent upper surface image to the processor 90.

The processor 90 extracts a touchable region from the transmitted adjacent upper surface images at operation S136. Next, the processor 90 compares the extracted touchable region with the reference touchable region stored in the memory 91 to calculate the position of the input object 70 at operation S137.

In detail, the processor 90 removes regions outside the upper surface 25 of the light guide plate 20 from the transmitted first adjacent upper surface image, and extracts the image of the region corresponding to the upper surface 25 of the light guide plate 20 as a first touchable region. Next, the processor 90 compares the first touchable region with the reference touchable region stored in the memory 91 to calculate first coordinates at which the tip of the finger (i.e., input object 70) is located.

In addition, the processor 90 removes regions outside the upper surface 25 of the light guide plate 20 from the transmitted second adjacent upper surface image, and extracts the image of the region corresponding to the upper surface 25 of the light guide plate 20 as a second touchable region. Next, the processor 90 compares the second touchable region with the reference touchable region stored in the memory 91 to calculate second coordinates at which the tip of the finger (i.e., input object 70) is located. In this case, because the finger (i.e., input object 70) is positioned at an arbitrary point over the light guide plate 20, the first coordinates and the second coordinates calculated by the processor 90 are the same.

As described above, in the touch display apparatus 1 according to an embodiment, infrared rays are emitted from the first and second light source arrays 30 and 40, and infrared rays reflected by the input object 70 are captured by the first camera 51 and the second camera 52 so that the coordinates of the input object 70 are recognized. Accordingly, the coordinates of the input object 70 may be recognized better than when a single light source array is used.

In detail, because the touch display apparatus 1 according to an embodiment emits infrared rays using the first and second light source arrays 30 and 40 arranged in two parallel rows, the amount of infrared rays reflected by the input object 70 is greater than that of the touch display apparatus 1 using the light source array 30 arranged in one row as in the above-described embodiment. Accordingly, it is easy to recognize the coordinates of the input object 70 and the accuracy of coordinate recognition may be increased.

In addition, because the touch display apparatus 1 according to an embodiment includes the second light source array 40 disposed over the light guide plate 20, height H2 at which the spatial touch is possible to recognize the coordinates of the tip of the input object 70 while being spaced apart from the upper surface 25 of the light guide plate 20 without directly touching the upper surface 25 of the light guide plate 20 is higher than the height H1 of the spatial touch of the touch display apparatus 1 including the light source array 30 arranged in one row as in the above-described embodiment.

In addition, because the touch display apparatus 1 according to an embodiment uses two cameras 51 and 52, when one of the two cameras 51 and 52 does not recognize the input object 70, the coordinates of the input object 70 may be recognized. Accordingly, an error in which the touch display apparatus 1 does not recognize the coordinates of the input object 70 may be minimized compared to the case of using one camera.

The touch display apparatus 1 configured to calculate the coordinates of the input object 70 using the two cameras 51 and 52 has been described above; however, the touch display apparatus according to an embodiment is not limited thereto. A touch display apparatus according to an embodiment may include only one camera as illustrated in FIG. 14.

Figure 14:
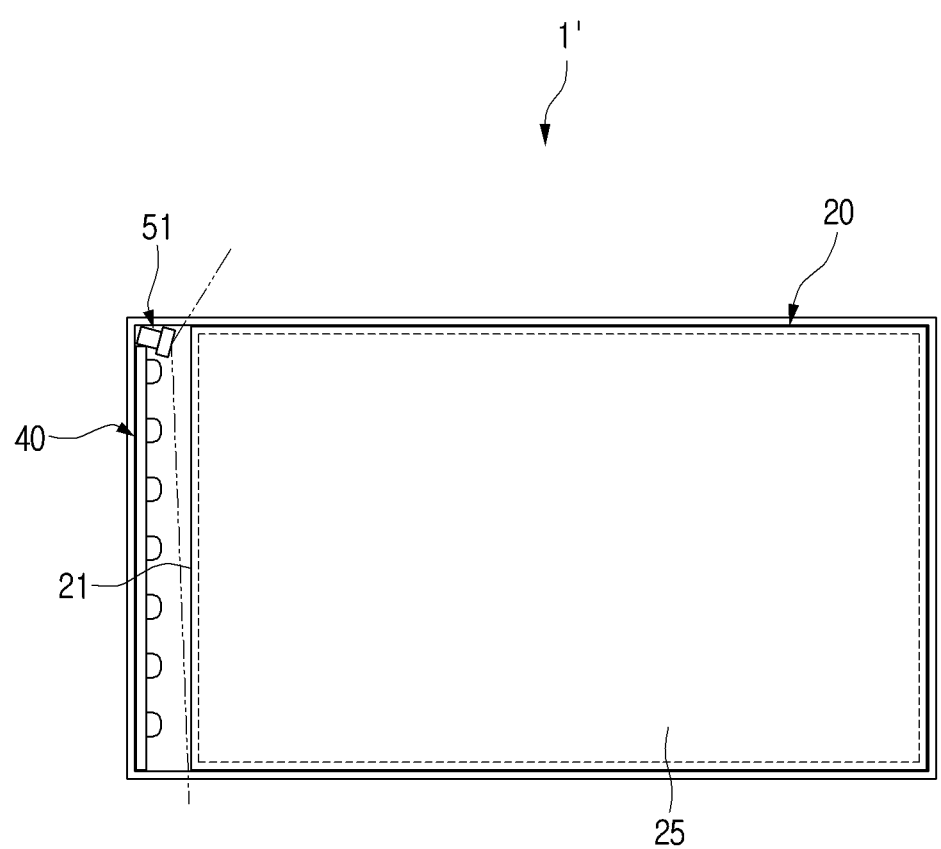
FIG. 14 is a plan view illustrating a touch display apparatus according to an embodiment of the disclosure.

FIG. 14 is a view illustrating a touch display apparatus according to an embodiment of the disclosure.

Referring to FIG. 14, a touch display apparatus 1' according to an embodiment may include a display panel 10, a light guide plate 20, first and second light source arrays 30 and 40, a camera 51, and a processor 90.

The touch display apparatus 1' as illustrated in FIG. 14 is the same as the touch display apparatus 1 according to the above-described embodiment, except that one camera 51 is disposed on one side of the second light source array 40 to photograph the entire area of the upper surface 25 of the light guide plate 20. Therefore, a detailed description thereof is omitted.

In the case of the embodiment shown in FIG. 14, the processor 90 may be configured to photograph an upper surface image and an adjacent upper surface image using the single camera 51 and to calculate the coordinates of the input object 70 using the upper surface image and the adjacent upper surface image.

The touch display apparatus 1' having one camera 51 as illustrated in FIG. 14 may be more likely to cause an error in which the coordinates of the input object 70 cannot be calculated than the touch display apparatus 1 having two cameras 51 and 52 as in the above-described embodiment.

The touch display apparatus according to an embodiment having the structure as described above may recognize the coordinates of the input object when the input object is in contact with the upper surface of the light guide plate and when the input object is adjacent to the upper surface of the light guide plate without contacting the upper surface, and then control the display surface.

In addition, because the touch display apparatus according to an embodiment recognizes the upper surface of the light guide plate as a touchable region, an error of misrecognizing the coordinates of the input object due to infrared rays reflected from the area outside the light guide plate may be prevented.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A touch display apparatus comprising:
   a display panel comprising a display surface;
   a light guide plate having a first side surface, a second side surface, a third side surface, and a fourth side surface is disposed over the display surface of the display panel so as to overlap the display surface of the display panel;
   a first light source array disposed on one side of the light guide plate and comprising a plurality of infrared light sources configured to emit infrared rays incident to the first side surface of the light guide plate, wherein the plurality of infrared light sources are arranged in a straight line along the first side surface of the light guide plate over the display panel, and wherein the light guide plate is formed so that the infrared rays incident to the first side surface are emitted through an upper surface of the light guide plate but not emitted through the second side surface, the third side surface, and the fourth side surface of the light guide plate;
   a second light source array disposed above the first light source array, parallel to and adjacent to the first side surface of the light guide plate, and comprising a plurality of infrared light sources configured to emit infrared rays toward an upper side of the upper surface of the light guide plate, wherein infrared rays emitted from the second light source array is not incident to the first side surface of the light guide plate;
   a camera disposed on at least one side end of the second light source array and configured to photograph infrared rays emitted through an entire area of the upper surface of the light guide plate and infrared rays emitted from the second light source array; and
   at least one processor configured to recognize two-dimensional coordinates of an input object spaced apart from the upper surface of the light guide plate by a predetermined distance using infrared rays images captured by the camera.

2. The touch display apparatus of claim 1, wherein the plurality of infrared light sources of the second light source array are disposed in a straight line parallel to the plurality of infrared light sources of the first light source array.

3. The touch display apparatus of claim 2 further comprising:
   a printed circuit board on which the plurality of infrared light sources of the first light source array and the plurality of infrared light sources of the second light source array are disposed in two rows.

4. The touch display apparatus of claim 3, wherein the at least one processor is disposed on the printed circuit board.

5. The touch display apparatus of claim 1, wherein the at least one processor is further configured to:
   recognize a reference touchable region from an upper surface image of the light guide plate captured by the camera in a state in which the first light source array is turned on and the second light source array is turned off, and
   when recognizing the two-dimensional coordinates of the input object adjacent to the light guide plate:
      extract a touchable region by removing a region outside the upper surface of the light guide plate from an adjacent upper surface image of the light guide plate captured by the camera while the first light source array and the second light source array are turned on, and
      detect the two-dimensional coordinates of the input object by comparing the touchable region with the reference touchable region.

6. The touch display apparatus of claim 1,
   wherein the light guide plate is formed in a rectangular flat plate shape, and comprises a first surface, a second surface facing the first surface and over which the display panel is disposed, and four side surfaces,
   wherein the first light source array is disposed such that infrared rays are incident on a first side surface of the four side surfaces of the light guide plate, and
   wherein the light guide plate is formed so that the infrared rays incident on the first side surface are emitted through the first surface.

7. The touch display apparatus of claim 6, wherein the plurality of infrared light sources of the first light source array are disposed in a straight line along the first side surface of the light guide plate.

8. The touch display apparatus of claim 6, wherein a second side surface and a third side surface perpendicular to the first side surface among the four side surfaces of the light guide plate are formed so that infrared rays incident from the first light source array into the light guide plate are not emitted to an outside of the light guide plate.

9. The touch display apparatus of claim 6, wherein the first surface and the second surface are formed in a rectangular shape and face each other in parallel.

10. The touch display apparatus of claim 9, the first surface forms the upper surface of the light guide plate and the second surface forms a lower surface of the light guide plate.

11. The touch display apparatus of claim 1, wherein the camera comprises a wide-angle lens and an image sensor to photograph infrared rays emitted from the first light source array and emitted through the entire area of the upper surface of the light guide plate.

12. The touch display apparatus of claim 11, wherein an angle of view of the wide-angle lens is greater than 90 degrees.

13. The touch display apparatus of claim 1, wherein the camera comprises:
   a first camera disposed on one side of the first light source array and configured to photograph the entire area of the upper surface of the light guide plate; and
   a second camera disposed on another side of the first light source array opposite to the first camera and configured to photograph the entire area of the upper surface of the light guide plate.

14. The touch display apparatus of claim 13,
   wherein each of the first camera and the second camera comprise a wide-angle lens and an image sensor, and
   wherein an angle of view of the wide-angle lens is greater than 90 degrees.

15. The touch display apparatus of claim 1, wherein the at least one processor is further configured to:
   recognize a reference touchable region from an upper surface image of the light guide plate captured by the camera in a state in which the first light source array is turned on, and
   when recognizing the two-dimensional coordinates of the input object adjacent to the light guide plate:
      extract a touchable region by removing a region outside the upper surface of the light guide plate from an adjacent upper surface image of the light guide plate captured by the camera while the first light source array is turned on, and
      recognize the two-dimensional coordinates of the input object by comparing the extracted touchable region with the reference touchable region.

16. The touch display apparatus of claim 1, wherein the plurality of infrared light sources comprises a plurality of infrared light emitting diodes (LEDs).

17. The touch display apparatus of claim 1, wherein the light guide plate is larger in size than a size of the display surface of the display panel.

\* \* \* \* \*